US012021689B1

(12) United States Patent
Rayes et al.

(10) Patent No.: US 12,021,689 B1
(45) Date of Patent: Jun. 25, 2024

(54) NETWORK SUSTAINABILITY INDEX

(71) Applicant: Cisco Technology, Inc., San Jose, CA (US)

(72) Inventors: Ammar Rayes, Alamo, CA (US); Samer M. Salam, Beirut (LB); Balaji R. Venkatraman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/345,099

(22) Filed: Jun. 30, 2023

(51) Int. Cl.
*G06F 15/16* (2006.01)
*H04L 41/0833* (2022.01)
*H04L 41/14* (2022.01)
*H04L 43/0876* (2022.01)

(52) U.S. Cl.
CPC ........ *H04L 41/0833* (2013.01); *H04L 41/145* (2013.01); *H04L 43/0876* (2013.01)

(58) Field of Classification Search
CPC  H04L 41/145; H04L 41/0833; H04L 43/0876
USPC ......................................................... 709/220
See application file for complete search history.

(56) References Cited

U.S. PATENT DOCUMENTS

| | | | | |
|---|---|---|---|---|
| 8,645,195 B1* | 2/2014 | Shpritz | ................. | G06Q 10/06 705/35 |
| 8,694,163 B2* | 4/2014 | Brzezowski | ..... | G06Q 10/06315 702/182 |
| 8,892,540 B2* | 11/2014 | Walker | .............. | G06F 16/24578 707/706 |
| 9,094,450 B2* | 7/2015 | Sanders | ................ | H04L 63/145 |
| 9,129,231 B2* | 9/2015 | Kaufman | ............ | G06Q 10/0639 |
| 9,406,036 B2* | 8/2016 | Kaufman | ................ | G06Q 10/06 |
| 10,726,026 B2* | 7/2020 | Walker | ................ | G06F 16/9538 |
| 11,714,688 B1* | 8/2023 | Misra | .................... | G06F 9/5077 718/104 |
| 11,818,006 B2* | 11/2023 | Palmero | ................. | G06Q 10/04 |
| 11,863,388 B1* | 1/2024 | Pignataro | ................ | H04L 41/12 |
| 2011/0243032 A1 | 10/2011 | Jenne et al. | | |

(Continued)

FOREIGN PATENT DOCUMENTS

EP 3190518 A1 7/2017

*Primary Examiner* — Moustafa M Meky
(74) *Attorney, Agent, or Firm* — Rutan & Tucker LLP; Ravi Mohan

(57) ABSTRACT

Described herein are devices and methods for calculating a network sustainability index (NSI) and providing specific remediation/action plans to achieve better sustainability in network infrastructures. The NSI is calculated based on one or more of three main parameters: a reporting parameter, an optimization parameter, and/or a device energy efficiency rating. The reporting parameter may evaluate the capability of each device to report its power consumption, considering factors such as granularity, component-level reporting, and reporting frequency. The optimization parameter may assess whether a device participates in network energy optimization. The device energy efficiency rating may evaluate the energy efficiency of each device. A recommendation portal offers actionable insights and remediation plans based on the calculated NSI. The devices and methods allow administrators to list eligible devices for energy optimization, ensuring a comprehensive approach to network sustainability and facilitating targeted measures for improved energy efficiency.

20 Claims, 6 Drawing Sheets

(56) References Cited

U.S. PATENT DOCUMENTS

| | | | |
|---|---|---|---|
| 2011/0320054 A1* | 12/2011 | Brzezowski | G06Q 50/06 |
| | | | 700/291 |
| 2013/0103831 A1 | 4/2013 | Kodama et al. | |
| 2015/0023196 A1 | 1/2015 | Schlenk | |
| 2015/0128276 A1* | 5/2015 | Sanders | H04L 63/145 |
| | | | 726/24 |
| 2021/0058859 A1 | 2/2021 | Henry et al. | |
| 2023/0239211 A1* | 7/2023 | Palmero | H04L 41/0833 |

* cited by examiner

NETWORK SUSTAINABILITY INDEX

The present disclosure relates to network sustainability and optimization. More particularly, the present disclosure relates to calculating a network sustainability index (NSI) and providing associated action plans.

BACKGROUND

The increasing demand for network connectivity and the rapid growth of connected devices have led to a significant rise in energy consumption by network infrastructure. As a result, there is a growing need for sustainable and energy efficient network solutions to minimize the environmental impact and reduce operational costs. Many organizations are seeking ways to optimize their network energy usage and improve their overall sustainability performance. However, achieving this goal can be challenging due to the complexity of network infrastructures and the diverse needs of different organizations and network configurations.

Existing network energy management solutions typically focus on monitoring and reporting power consumption at the device level. While this data is useful for identifying high-energy-consuming devices, it does not provide a comprehensive view of the network's overall sustainability performance. Moreover, these solutions often lack the ability to adapt to specific network conditions and requirements, such as varying traffic patterns, device capabilities, and organizational priorities. This limitation hinders organizations from effectively implementing energy-saving measures and achieving their sustainability goals.

Furthermore, existing solutions do not provide a standardized method for evaluating the sustainability performance of a network. Organizations are often left to manually analyze the collected data and devise their own strategies for reducing energy consumption. This process can be time consuming and prone to errors, as it requires a deep understanding of the network infrastructure and the various factors affecting energy usage. Additionally, the lack of a unified approach to network sustainability assessment makes it difficult for organizations to compare their performance against industry benchmarks or track their progress over time, limiting their ability to achieve optimal energy efficiency and sustainability.

SUMMARY OF THE DISCLOSURE

Systems and methods for calculating a network sustainability index (NSI) and providing associated action plans in accordance with embodiments of the disclosure are described herein. In some embodiments, a device includes a processor, at least one network interface controller configured to provide access to a network, and a memory communicatively coupled to the processor. The memory includes a sustainability evaluation logic that is configured to identify a plurality of network devices of the network, collect network device data from each of the plurality of network devices, calculate a network sustainability index of the network based on the network device data, and generate an indication associated with the network based on the calculated network sustainability index.

In some embodiments, the network device data for a network device of the plurality of network devices includes one or more of: a reporting parameter associated with the network device, an optimization parameter associated with the network device, or an energy efficiency rating associated with the network device.

In some embodiments, the reporting parameter associated with the network device corresponds to at least one of: a first configuration associated with power consumption reporting, a second configuration associated with power consumption reporting at a component level granularity, a third configuration associated with power consumption reporting at a trunk port level granularity, or a fourth configuration associated with a power consumption reporting frequency.

In some embodiments, the optimization parameter associated with the network device corresponds to a configuration associated with participating in network energy optimization.

In some embodiments, each of the reporting parameter associated with the network device, the optimization parameter associated with the network device, or the energy efficiency rating associated with the network device is associated with a respective weight, and the network sustainability index is calculated based further on a set of weights.

In some embodiments, the generated indication is indicative of a satisfactory level of network energy optimization in response to the network sustainability index being greater than a predetermined threshold.

In some embodiments, the generated indication is indicative of at least one network device with suboptimal energy optimization in the plurality of network devices in response to the network sustainability index being less than a predetermined threshold.

In some embodiments, the generated indication is indicative of at least one recommended action in response to the network sustainability index being less than a predetermined threshold.

In some embodiments, the at least one recommended action includes at least one of a recommended network device reconfiguration associated with a first network device or a recommended network device replacement associated with a second network device.

In some embodiments, the at least one recommended action includes the recommended network device replacement associated with the second network device when the second network device is associated with a first energy efficiency rating that is less than an energy efficiency rating threshold, and the sustainability evaluation logic is further configured to create a configuration file for a replacement network device based on one or more configurations of the second network device.

In some embodiments, a device, includes a processor, at least one network interface controller configured to provide access to a network, a display, and a memory communicatively coupled to the processor. The memory includes a sustainability evaluation logic that is configured to identify a plurality of network devices of the network, collect network device data from each of the plurality of network devices, calculate a network sustainability index of the network based on the network device data, generate an indication associated with the network based on the calculated network sustainability index, configure the indication for display on the display, and display the configured indication on the display.

In some embodiments, the network device data for a network device of the plurality of network devices includes one or more of: a reporting parameter associated with the network device, an optimization parameter associated with the network device, or an energy efficiency rating associated with the network device.

In some embodiments, the displayed indication indicates a satisfactory level of network energy optimization to a user.

In some embodiments, the displayed indication indicates at least one network device with suboptimal energy optimization in the plurality of network devices to a user.

In some embodiments the displayed indication indicates at least one recommended action to a user.

In some embodiments, a method for network sustainability management, includes identifying a plurality of network devices of a network, collecting network device data from each of the plurality of network devices, calculating a network sustainability index of the network based on the network device data, and generating an indication associated with the network based on the calculated network sustainability index.

In some method embodiments, the network device data for a network device of the plurality of network devices includes one or more of: a reporting parameter associated with the network device, an optimization parameter associated with the network device, or an energy efficiency rating associated with the network device.

In some method embodiments, the reporting parameter associated with the network device corresponds to at least one of: a first configuration associated with power consumption reporting, a second configuration associated with power consumption reporting at a component level granularity, a third configuration associated with power consumption reporting at a trunk port level granularity, or a fourth configuration associated with a power consumption reporting frequency.

In some method embodiments, the optimization parameter associated with the network device corresponds to a configuration associated with participating in network energy optimization.

In some method embodiments, each of the reporting parameter associated with the network device, the optimization parameter associated with the network device, or the energy efficiency rating associated with the network device is associated with a respective weight, and the network sustainability index is calculated based further on a set of weights.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
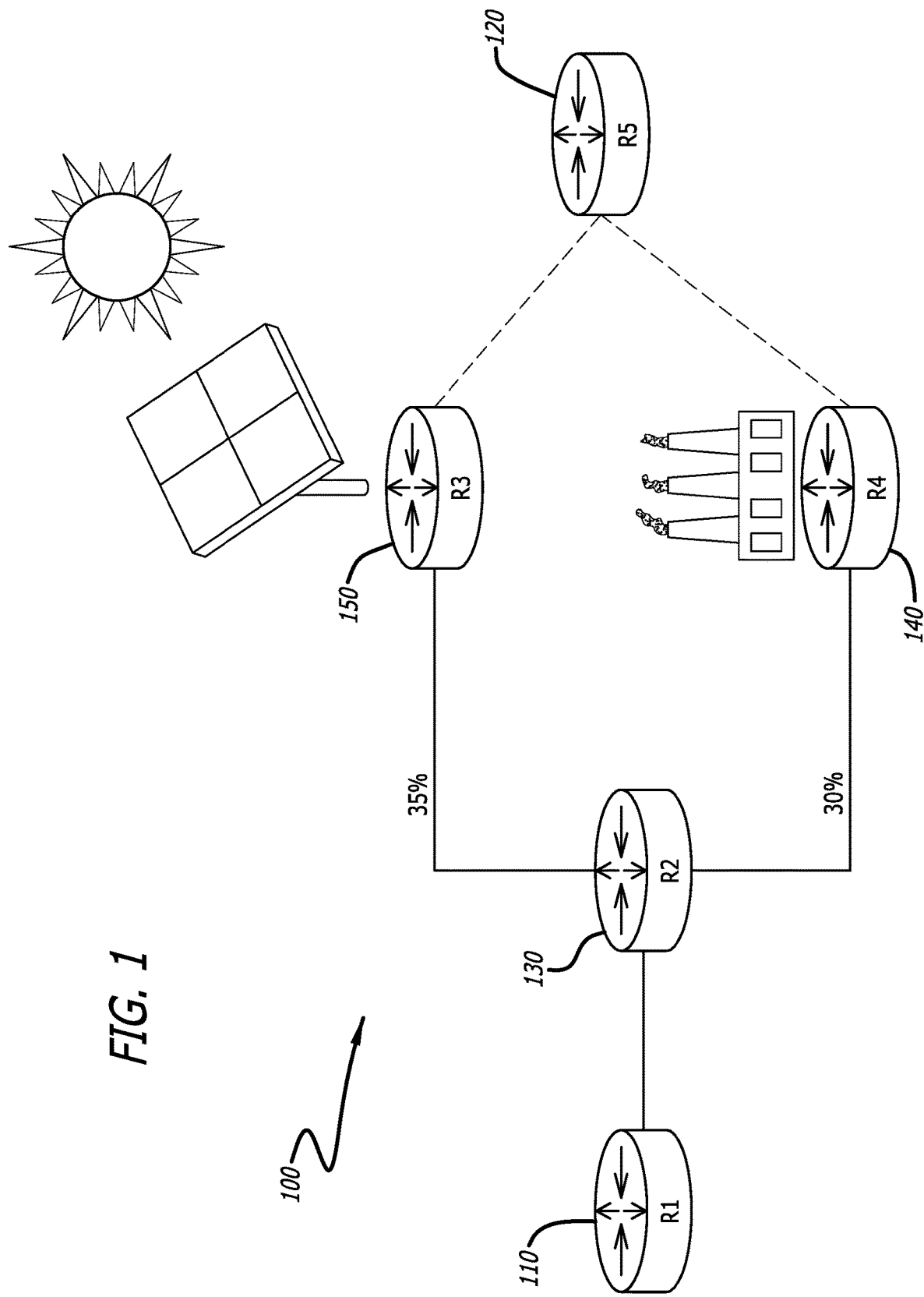
FIG. 1 is a schematic diagram of a network with network devices powered by various power source types in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that calculate a network sustainability index (NSI) and provide remediation/action plans to achieve better sustainability. These devices and methods may leverage artificial intelligence (AI) to assess the sustainability performance of a network based on various parameters, such as, but not limited to, reporting, optimization, and device energy efficiency. In many embodiments, the NSI may be calculated based on at least one of three main parameters: a reporting parameter, an optimization parameter, and a device energy efficiency rating. In a number of embodiments, the reporting parameter may evaluate the capability of each device to report its power consumption, considering factors such as granularity, component-level reporting, and reporting frequency. By way of a non-limiting example, in its simplest form, the reporting parameter can correspond to a binary reporting capability indicator (e.g., the device is capable of reporting its power consumption="1" and the device is not capable of reporting its power consumption="0"). By way of additional non-limiting examples, certain devices may report the overall power consumption but not the consumption per device component (e.g., per individual port/small form-factor pluggable (SFP) port, per central processing unit (CPU), per backplane, per cooling fan, etc.). By way of further non-limiting examples, some devices may report the power consumption per access port (i.e., access switch port), but not per trunk port. By way of another non-limiting example, the reporting frequency (e.g., daily reporting intervals, hourly reporting intervals, etc., as opposed to weekly or monthly reporting intervals, etc.) may also impact the reporting parameter and the overall NSI.

In a variety of embodiments, the optimization parameter may assess whether a device participates in network energy optimization. By way of a non-limiting example, a network optimization module (which may reside in the cloud or on-premises) may discover peak and off-peak hours (e.g., utilizing AI-based learning components) and may optimize power consumption of access points (APs) accordingly. This optimization process can be based on telemetry data collected by network management systems (e.g., AI-based radio resource management (RRM) modules, or other suitable network management systems). Further, the optimization process may power the APs on/off and/or configure the APs with appropriate bands, channels, and/or transmission power levels to meet service level agreement (SLA) specifications (e.g., floorplan coverage specifications) as well as reduce power consumption. In some embodiments, the device energy efficiency rating (e.g., an energy star rating) may evaluate the energy efficiency of each device. By way of a non-limiting example, the device energy efficiency rating may be a number on a scale from 1 to 5, with higher ratings indicating greater efficiency.

In more embodiments, the parameters can be weighted. By way of a non-limiting example, the parameters may be weighted based on organizational priorities and specifications. For example, organizations can assign greater importance to certain aspects of sustainability performance that are most relevant to their goals and objectives. Accordingly, the NSI may be calculated using a formula that takes into account the weighted parameters, providing a standardized metric for evaluating network sustainability. Collecting the data and calculating the NSI manually may not be feasible due to the number of devices involved and the calculation/refresh speed/frequency specification (e.g., an SLA may specify that the NSI be recalculated/refreshed with a minimum frequency, such as once an hour, once every 4 hours, etc.).

In additional embodiments, a portal (e.g., a suggestion portal) may be provided that offers actionable insights and remediation plans based on the calculated NSI. In certain embodiments, if the NSI corresponds to a fully optimized state vis-à-vis the energy use optimization and sustainability of the network, the portal can provide a positive indication (e.g., an affirmation). Otherwise, the portal can identify areas where improvement can be made, such as devices with limited reporting capabilities, suboptimal participation in energy optimization, and/or high power consumption. In further embodiments, the portal can also recommend device refreshes (i.e., device replacement) for existing devices with poor energy efficiency ratings. By way of a non-limiting example, the portal can suggest suitable replacements. In additional embodiments, the portal may automatically generate new configuration files for the replacement devices (i.e., the new devices) based on the old device configurations.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB), application-specific integrated circuits, or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram of a network 100 with network devices powered by various power source types in accordance with an embodiment of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the CO2e kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better CO2e kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be utilized, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-6 as required to realize a particularly desired embodiment. Augmented protocols to carry out these described processes are described below.

Figure 2:
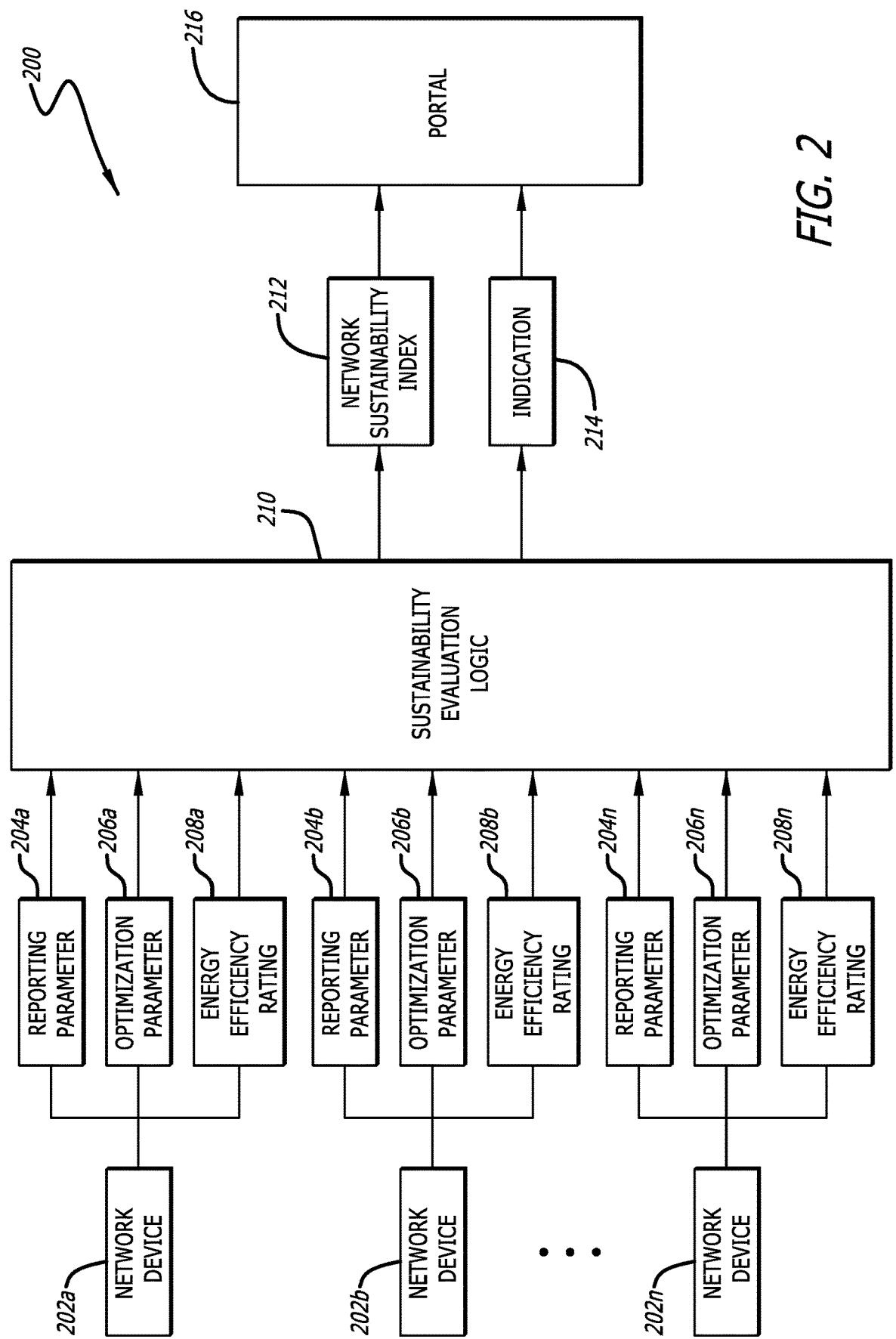
FIG. 2 is a schematic diagram illustrating example devices and methods for calculating an NSI and providing action plans to achieve better sustainability in accordance with an embodiment of the disclosure.

Referring to FIG. 2, a schematic diagram 200 illustrating example devices and methods for calculating an NSI and providing action plans to achieve better sustainability in accordance with an embodiment of the disclosure is shown. The three network devices 202a, 202b, and 202n are exemplary and can conceptually represent a variety of devices within a network. The ellipsis between network device 202b and network device 202n can signify the presence of additional network devices in the network.

In many embodiments, each network device may be associated with one or more of at least three parameters: a reporting parameter, an optimization parameter, and an energy efficiency rating. For instance, the network device 202a may be associated with a reporting parameter 204a, an optimization parameter 206a, and an energy efficiency rating 208a. In a similar manner, the network device 202b may be associated with a reporting parameter 204b, an optimization parameter 206b, and an energy efficiency rating 208b, while network device 202n may be associated with a reporting parameter 204n, an optimization parameter 206n, and an energy efficiency rating 208n.

In a number of embodiments, as described above, the reporting parameter may evaluate the capability of each device to report its power consumption, considering factors such as granularity, component-level reporting, and reporting frequency. In some embodiments, the reporting parameter can correspond to a binary reporting capability indicator (e.g., the device is capable of reporting its power consumption="1" and the device is not capable of reporting its power consumption="0"). In further embodiments, certain devices may report the overall power consumption but not the consumption per device component (e.g., per individual port/SFP port, per central processing unit (CPU), per backplane, per cooling fan, etc.). In more embodiments, some devices may report the power consumption per access port, but not per trunk port. In additional embodiments, the reporting frequency (e.g., daily reporting intervals, hourly reporting intervals, etc., as opposed to weekly or monthly reporting intervals, etc.) may also impact the reporting parameter and the overall NSI. As those skilled in the art would recognize, in various embodiments, more detailed and/or more frequent power consumption reporting at a device may lead to a greater reporting parameter value for the device and a higher overall NSI.

In some embodiments, as described above, the optimization parameter may assess whether a device participates in network energy optimization. By way of a non-limiting example, a network optimization module (which may reside in the cloud or on-premises) may discover peak and off-peak hours (e.g., utilizing AI-based learning components) and may optimize power consumption of APs accordingly. This optimization process can be based on telemetry data collected by network management systems (e.g., AI-based RRM modules, or other suitable network management systems). In further embodiments, the optimization process may power the APs on/off and/or configure the APs with appropriate bands, channels, and/or transmission power levels to meet SLA specifications (e.g., floorplan coverage specifications) as well as reduce power consumption. In still more embodiments, the optimization process can take into consideration the fact that a device may not be powered off even during an off-peak period because software/firmware updates/upgrades may be scheduled for the device during the off-peak period. In such embodiments, the portal 216, which will be described in further detail below, may provide a list of such devices so that another module or a network administrator may make energy optimization decisions about the devices. In additional embodiments, in general, persons skilled in the art would recognize that a device that is capable of (eligible for) participating in network energy optimization but is not participating may lead to a lower optimization parameter value for the device and a lower overall NSI. In further embodiments, the device energy efficiency rating (e.g., an energy star rating) may evaluate the energy efficiency of each device. By way of non-limiting examples, the device energy efficiency rating may be a binary digit (e.g., a 0 or 1) or a number on a scale from 1 to 5, with higher ratings indicating greater efficiency.

In still more embodiments, the data collected from the network devices 202a, 202b, and 202n, including the parameters described above, may be provided to a sustainability evaluation logic 210. In still further embodiments, the sustainability evaluation logic 210 can process the reporting parameter, the optimization parameter, and the energy efficiency rating of each network device to compute the NSI 212. The NSI 212 may serve as a standardized metric for assessing network sustainability.

In still additional embodiments, the parameters can be weighted in the calculation of the NSI 212. In a variety of embodiments, the parameters may be weighted based on organizational priorities and specifications. For example, organizations can assign greater importance to certain aspects of sustainability performance that are most relevant to their goals and objectives. In certain embodiments, if multiple organizations share some network devices, each organization may calculate its own NSI and receive improvement recommendations, accordingly, taking into consideration the sustainability performance of both the shared devices and the devices used exclusively by the organization. Accordingly, the NSI may be calculated using a formula that takes into account the weighted parameters (which may reflect organizational priorities and specifications), providing a standardized metric for evaluating network sustainability. In some more embodiments, the NSI may be calculated as follows:

$$NSI = \sum_{i=1}^{n}(w1*R) + (w2*O) + (w3*D),$$

where i is the device index, R is the reporting parameter, O is the optimization parameter, D is the energy efficiency rating, $0 \leq wi \leq 100$, and w1+w2+I w3=100. Those skilled in the art would recognize that wi are the weight parameters (weights).

In certain embodiments, based on the NSI 212, the sustainability evaluation logic 210 may further generate an indication 214, which can convey information about the energy optimization status of the network, or can highlight areas where improvement can be made. In yet more embodiments, a portal 216 (e.g., a recommendation portal) may present the NSI 212 and the indication 214 to a user (e.g., a network administrator). In other words, the portal 216 may present the calculated NSI 212, and may offer actionable insights or remediation plans based on the NSI 212. In some embodiments, the portal 216 may provide a list of devices that are energy inefficient. In more embodiments, the portal 216 can provide a list of devices that do not provide power consumption reporting or do not report power consumption with sufficient detail or frequency. For instance, the devices can be identified based on one or more of a hostname, a serial number (SN), a product identifier (PID), or an interface, etc. In yet more embodiments, the portal 216 can provide a list of devices that are capable of participating in network energy optimization but are not participating. In a further non-limiting example, the portal 216 can recommend that certain specified devices be replaced with more energy efficient versions. Accordingly, through the portal 216, organizations can monitor their network's sustainability performance and implement targeted measures to enhance network energy efficiency and minimize environmental impact.

Although a specific embodiment for a schematic diagram illustrating the calculation of an NSI and providing action plans suitable for carrying out the various steps, processes, methods, and operations described herein is discussed with respect to FIG. 2, any of a variety of systems and/or processes may be utilized in accordance with embodiments of the disclosure. For example, the sustainability evaluation logic may be integrated with one or more machine learning processes to predict future energy consumption trends and proactively adjust optimization parameters to further enhance network sustainability. The elements depicted in FIG. 2 may also be interchangeable with other elements of FIGS. 1 and 3-6 as required to realize a particularly desired embodiment.

Figure 3:
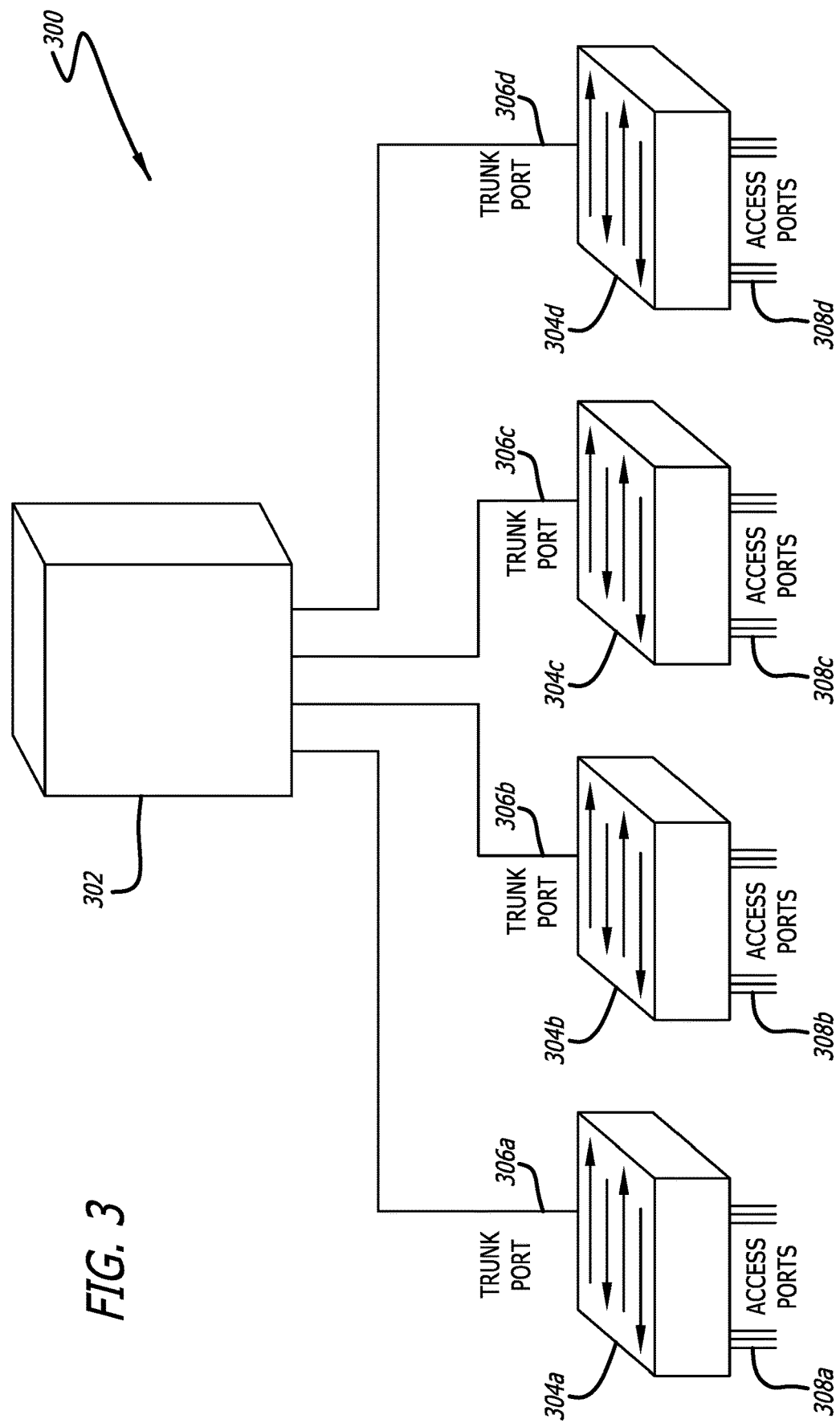
FIG. 3 is a schematic diagram depicting an example network topology associated with energy consumption reporting granularity in accordance with an embodiment of the disclosure.

Referring to FIG. 3, a schematic diagram 300 depicting an example network topology associated with energy consumption reporting granularity in accordance with an embodiment of the disclosure is shown. As described above, some devices may report the power consumption per access port, but not per trunk port. Some other devices may report the power consumption per trunk port, but not per access port. Still other devices may report the power consumption on both the per access port and per trunk port bases. Still further devices may report the power consumption on just the device level but not per access port or per trunk port. FIG. 3 depicts an aggregation switch 302 connected to four access/edge switches 304a, 304b, 304c, and 304d. In many embodiments, each of the aggregation switch 302 and/or the access/edge switches 304a, 304b, 304c, and 304d may have a power consumption reporting capability relating to reporting granularity (e.g., per device but not per access port/trunk port reporting, per access port but not per trunk port reporting, per trunk port but not per access port reporting, both per access port and per trunk port reporting, etc.).

In a number of embodiments, each access/edge switch 304a, 304b, 304c, or 304d may feature a trunk port 306a, 306b, 306c, or 306d. In a variety of embodiments, the aggregation switch 302 may be connected to the access/edge switches 304a, 304b, 304c, or 304d through their respective trunk ports 306a, 306b, 306c, and 306d. By way of non-limiting examples, the trunk ports 306a, 306b, 306c, and 306d can serve the purpose of consolidating traffic to or from numerous access ports 308a, 308b, 308c, and 308d on the access/edge switches 304a, 304b, 304c, or 304d. In a variety of embodiments, the access ports 308a, 308b, 308c, and 308d may facilitate the connection of end devices, such as, but not limited to, computers, printers, and other network equipment, to the network. In some embodiments, an access/edge switch may receive data destined to any of its access ports from the aggregation switch via its trunk port and direct the received data to the appropriate access port. Further, the access/edge switch may consolidate data received via its access ports and forward the consolidated data to the aggregation switch via its trunk port.

In some embodiments, the granularity of power consumption reporting for each of the devices shown in the embodiment as depicted in FIG. 3 may differ based on the capabilities of the devices including the aggregation switch 302 and the access/edge switches 304a, 304b, 304c, and 304d. In a variety of embodiments, certain switches can report power consumption at the overall switch level, while others can offer more detailed data, including power consumption per access port and/or per trunk port. In more embodiments, as described above, this variation in reporting granularity can influence the calculation of the reporting parameter within the NSI calculation and the subsequent optimization of network energy usage.

Although a specific embodiment for a schematic diagram illustrating a network topology related to power consumption reporting granularity suitable for carrying out the various steps, processes, methods, and operations described herein is discussed with respect to FIG. 3, any of a variety of systems and/or processes may be utilized in accordance with embodiments of the disclosure. For example, the network topology can be extended to include additional layers of switches, such as distribution switches, to accommodate larger and more complex network infrastructures while still maintaining the reporting granularity and energy optimization capabilities. The elements depicted in FIG. 3 may also be interchangeable with other elements of FIGS. 1, 2, and 4-6 as required to realize a particularly desired embodiment.

Figure 4:
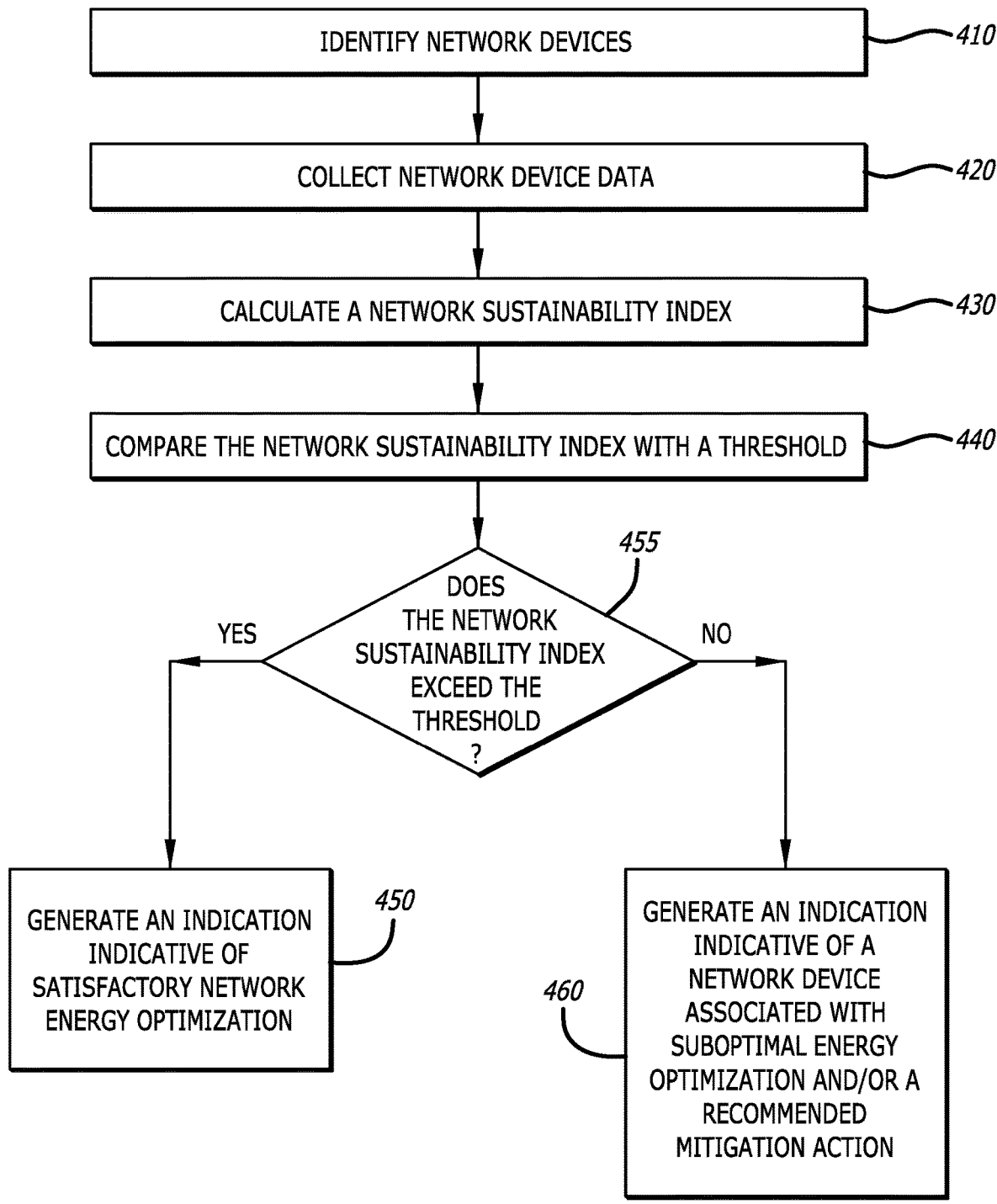
FIG. 4 is a flowchart depicting a process for generating and utilizing an NSI in accordance with an embodiment of the disclosure.

Referring to FIG. 4, a flowchart depicting a process 400 for generating and utilizing an NSI in accordance with an embodiment of the disclosure is shown. In many embodiments, the process 400 may identify multiple network devices of a network (block 410). In some embodiments, the process 400 may identify the network devices through the use of medium access control (MAC) addresses. The network devices may include routers, switches, and/or servers, and so on.

In a number of embodiments, the process 400 may collect network device data from each of the multiple network devices of the network (block 420). In various embodiments, the process 400 may collect the network device data by utilizing network management protocols such as simple network management protocol (SNMP) or network configuration protocol (NETCONF). The network device data may include a reporting parameter associated with the network device, an optimization parameter associated with the network device, and/or an energy efficiency rating associated with the network device.

In a variety of embodiments, the process 400 may calculate an NSI based on the network device data (block 430). In some embodiments, the process 400 may calculate the NSI based on one or more of the reporting parameters associated with the network devices, the optimization parameters associated with the network devices, and/or energy efficiency ratings associated with the network devices. The reporting parameters, the optimization parameters, and/or the energy efficiency ratings may each be associated with a weight in the calculation of the NSI.

In additional embodiments, the process 400 may compare the calculated NSI with a threshold (block 440). The threshold may be preconfigured or dynamically selected. In certain embodiments, the threshold may be determined by analyzing historical network performance data, industry standards, or specific requirements of the organization.

In still more embodiments, the process 400 may determine if the NSI exceeds the threshold (block 445). In additional embodiments, in response to determining that the NSI exceeds the threshold, the process 400 may generate an indication indictive of satisfactory network energy optimization (block 450). Thus, the indication may signify that the network is functioning efficiently in terms of energy usage. This indication can be a valuable measure for network administrators, enabling them to verify that the energy conservation techniques in place are successful and that the network is aligned with its sustainability objectives.

However, in further embodiments, when the NSI is determined as not exceeding the threshold, the process 400 may generate an indication indicative of a network device associated with suboptimal energy optimization and/or a recommended mitigation action (block 460). An example of a network device associated with suboptimal energy optimization may be a network device that is capable of participating in a network energy optimization operation but is not participating. The recommended mitigation action may include reconfiguring the network device to enroll the network device in the network energy optimization operation. Another example of a network device associated with suboptimal energy optimization may be a network device that is energy inefficient, where a more energy efficient replacement is available. Accordingly, the recommended mitigation action in various embodiments may include replacing the network device.

Although a specific embodiment for generation and utilization of the NSI suitable for carrying out the various steps, processes, methods, and operations described herein is discussed with respect to FIG. 4, any of a variety of systems and/or processes may be utilized in accordance with embodiments of the disclosure. For example, the process may continuously analyze network device data, enabling a proactive approach to energy optimization and network performance improvements. The elements depicted in FIG. 4 may also be interchangeable with other elements of FIGS. 1-3, 5, and 6 as required to realize a particularly desired embodiment.

Figure 5:
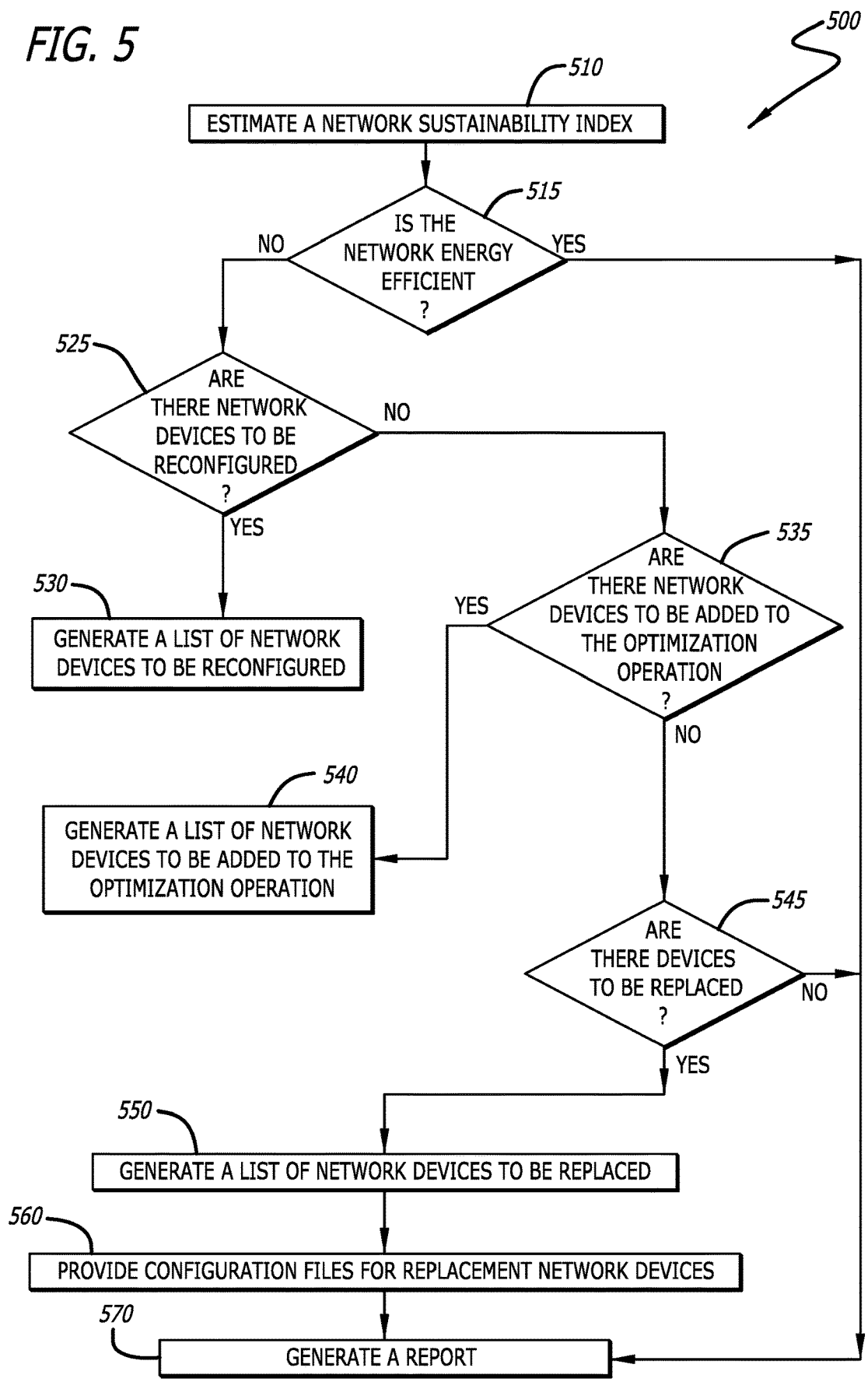
FIG. 5 is a flowchart depicting a process for generating and utilizing an NSI in accordance with an embodiment of the disclosure.

Referring to FIG. 5, a flowchart depicting a process 500 for generating and utilizing an NSI in accordance with an embodiment of the disclosure is shown. In many embodiments, the process 500 may estimate (calculate) an NSI for a network (block 510). By way of a non-limiting example, the process 500 may estimate the NSI for the network based on one or more of reporting parameters associated with the network devices, optimization parameters associated with the network devices, and/or energy efficiency ratings associated with the network devices. The reporting parameters, the optimization parameters, and/or the energy efficiency ratings may each be associated with a weight in the estimation of the NSI.

In a number of embodiments, the process 500 may determine if the network is energy efficient based on the estimated NSI (block 515). In some embodiments, the process 500 may determine if the network is energy efficient by comparing the estimated NSI against a threshold. The threshold may be preconfigured or dynamically determined.

In a variety of embodiments, in response to determining that the network is not energy efficient based on the estimated NSI, the process 500 may determine if there are network devices to be reconfigured in the network (block 525). In certain embodiments, the network may be energy inefficient because some network devices may not be reporting their energy consumption in an optimized fashion. Accordingly, the process 500 may determine that such network devices are to be reconfigured to optimize their energy consumption reporting (e.g., on a more frequent basis).

In some embodiments, in response to determining that there are network devices to be reconfigured in the network, the process 500 may generate a list of network devices to be reconfigured (block 530). In additional embodiments, the list of network devices to be reconfigured may include network devices that are not reporting their energy consumption in an optimized fashion. Accordingly, based on the list, network administrators may reconfigure the network devices to optimize their energy consumption reporting (e.g., on a more frequent basis).

In still more embodiments, the process 500 may determine if there are network devices to be added to the optimization operation (block 535). In some embodiments, the network may be energy inefficient because some network devices that are capable of participating in a network energy optimization operation are not participating. Accordingly, the process 500 may determine that such network devices are to be added to the network energy optimization operation. The network energy optimization operation may be based on AI-based learning and/or network device telemetry.

In yet more additional embodiments, in response to determining that there are network devices to be added to the optimization operation, the process 500 may generate a list of network devices to be added to the optimization operation (block 540). Accordingly, based on the list, network administrators may add the network devices to the network energy optimization operation. The network energy optimization operation may be controlled by a module that may be run in the cloud or on-premises.

In further embodiments, the process 500 may determine if there are network devices to be replaced in the network (block 545). By way of a non-limiting example, some legacy network devices may be energy inefficient and there may now be more energy efficient network devices available that may perform the same functions. In these instances, the legacy network devices may be replaced with the more energy efficient versions.

In still yet more embodiments, in response to determining that there are network devices to be replaced in the network, the process 500 may generate a list of network devices to be replaced (block 550). The process 500 may generate a list based on a dataset that includes data about network device performance, functionality, and power consumption. Accordingly, based on the list, network administrators may replace the legacy network devices with newer versions of network devices that may be more energy efficient.

In still further embodiments, the process 500 may provide configuration files for replacement network devices (block 560). The configuration files may be generated based on the in-use configurations of the legacy network devices that are to be replaced. The configuration files for the replacement network devices may enable the replacement network devices to promptly take over the functionality of the replaced network devices with minimal downtime.

In still additional embodiments, the process 500 may generate a network sustainability report (block 570). In certain embodiments, the process 500 may generate a network sustainability report by consolidating the collected device data, NSI, and any identified areas for improvement. The report may include detailed sections on energy consumption, device efficiency, and recommended actions, enabling network administrators to assess the current state of the network and make informed decisions for future optimizations.

Although a specific embodiment for generation and utilization of the NSI suitable for carrying out the various steps, processes, methods, and operations described herein is discussed with respect to FIG. 5, any of a variety of systems and/or processes may be utilized in accordance with embodiments of the disclosure. For example, the process may perform real-time analysis of network device data and generate sustainability reports. The elements depicted in FIG. 5 may also be interchangeable with other elements of FIGS. 1-4 and 6 as required to realize a particularly desired embodiment.

Figure 6:
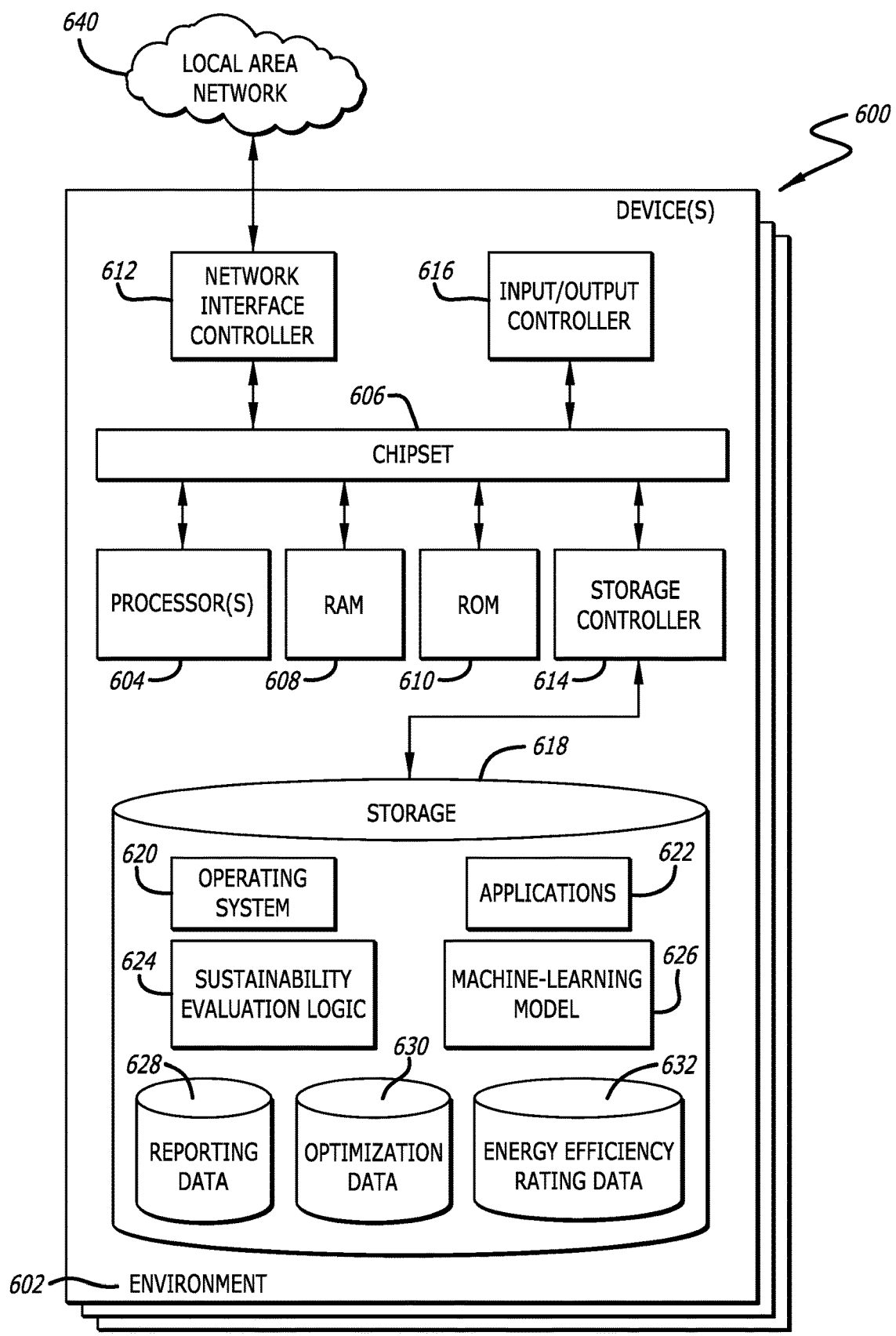
FIG. 6 is a conceptual block diagram for one or more devices capable of executing components and logic for implementing the functionality and embodiments described above.

Referring to FIG. 6, a conceptual block diagram for one or more devices 600 capable of executing components and logic for implementing the functionality and embodiments described above is shown. The embodiment of the conceptual block diagram depicted in FIG. 6 can illustrate a conventional server computer, workstation, desktop computer, laptop, tablet, network appliance, e-reader, smartphone, or other computing device, and can be utilized to execute any of the application and/or logic components presented herein. The device 600 may, in some examples, correspond to physical devices or to virtual resources described herein.

In many embodiments, the device 600 may include an environment 602 such as a baseboard or "motherboard," in physical embodiments that can be configured as a printed circuit board with a multitude of components or devices connected by way of a system bus or other electrical communication paths. Conceptually, in virtualized embodiments, the environment 602 may be a virtual environment that encompasses and executes the remaining components and resources of the device 600. In more embodiments, one or more processors 604, such as, but not limited to, central processing units ("CPUs") can be configured to operate in conjunction with a chipset 606. The processor(s) 604 can be standard programmable CPUs that perform arithmetic and logical operations necessary for the operation of the device 600.

In additional embodiments, the processor(s) 604 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 606 may provide an interface between the processor(s) 604 and the remainder of the components and devices within the environment 602. The chipset 606 can provide an interface to a random-access memory ("RAM") 608, which can be used as the main memory in the device 600 in some embodiments. In more embodiments, the memory, such as the RAM 608, can be communicatively coupled to the processor(s) 604. The chipset 606 can further be configured to provide an interface to a computer-readable storage medium such as a read-only memory ("ROM") 610 or non-volatile RAM ("NVRAM") for storing basic routines that can help with various tasks such as, but not limited to, starting up the device 600 and/or transferring information between the various components and devices. The ROM 610 or NVRAM can also store other application components necessary for the operation of the device 600 in accordance with various embodiments described herein.

Different embodiments of the device 600 can be configured to operate in a networked environment using logical connections to remote computing devices and computer systems through a network, such as the network 640. The chipset 606 can include functionality for providing network connectivity through a network interface card ("NIC") 612, which may comprise a gigabit Ethernet adapter or similar component. The NIC 612 can be capable of connecting the device 600 to other devices over the network 640. It is contemplated that multiple NICs 612 may be present in the device 600, connecting the device to other types of networks and remote systems.

In further embodiments, the device 600 can be connected to a storage 618 that provides non-volatile storage for data accessible by the device 600. The storage 618 can, for example, store an operating system 620, applications 622, reporting data 628, optimization data 630, and energy efficiency rating data 632, which are described in greater detail below. The storage 618 can be connected to the environment 602 through a storage controller 614 connected to the chipset 606. In certain embodiments, the storage 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 600 can store data within the storage 618 by transforming the physical state of the physical storage units to reflect the information being stored. The specific transformation of physical state can depend on various factors. Examples of such factors can include, but are not limited to, the technology used to implement the physical storage units, whether the storage 618 is characterized as primary or secondary storage, and the like.

For example, the device 600 can store information within the storage 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 600 can further read or access information from the storage 618 by detecting the physical states or characteristics of one or more particular locations within the physical storage units.

In addition to the storage 618 described above, the device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 600. In some examples, the operations performed by a cloud computing network, and or any components included therein, may be supported by one or more devices similar to device 600. Stated otherwise, some or all of the operations performed by the cloud computing network, and or any components included therein, may be performed by one or more devices 600 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 618 can store an operating system 620 utilized to control the operation of the device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 618 can store other system or application programs and data utilized by the device 600.

In various embodiment, the storage 618 or other computer-readable storage media is encoded with computer-executable instructions which, when loaded into the device 600, may transform it from a general-purpose computing system into a special-purpose computer capable of implementing the embodiments described herein. These computer-executable instructions may be stored as application 622 and transform the device 600 by specifying how the processor(s) 604 can transition between states, as described above. In some embodiments, the device 600 has access to computer-readable storage media storing computer-executable instructions which, when executed by the device 600, perform the various processes described above with regard to FIGS. 1-5. In more embodiments, the device 600 can also include computer-readable storage media having instructions stored thereupon for performing any of the other computer-implemented operations described herein.

In still further embodiments, the device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can be configured to provide output to a display, such as a computer monitor, a flat panel display, a digital projector, a printer, or other type of output device. Those skilled in the art will recognize that the device 600 might not include all of the components shown in FIG. 6 and can include other components that are not explicitly shown in FIG. 6 or might utilize an architecture completely different than that shown in FIG. 6.

As described above, the device 600 may support a virtualization layer, such as one or more virtual resources executing on the device 600. In some examples, the virtualization layer may be supported by a hypervisor that provides one or more virtual machines running on the device 600 to perform functions described herein. The virtualization layer may generally support a virtual resource that performs at least a portion of the techniques described herein.

In many embodiments, the device 600 can include a sustainability evaluation logic 624. The sustainability evaluation logic 624 may process the reporting data 628, the optimization data 630, and the energy efficiency rating data 632 to calculate the NSI. The sustainability evaluation logic 624 can take into account the weighted parameters based on organizational priorities and specifications and can generate recommended actions that may help to improve the sustainability performance of the organization's network.

In a number of embodiments, the storage 618 can include reporting data 628. The reporting data 628 may represent the capability of each network device to report its power consumption, considering factors such as granularity, component-level reporting, and reporting frequency. The reporting data 628 can enable organizations to monitor and analyze the power consumption trends of network devices, which can be useful in identifying areas for improvement and implementing targeted energy-saving measures.

In various embodiments, the storage 618 can include optimization data 630. The optimization data 630 may assess whether a network device participates in energy optimization. The optimization data 630 may help identify devices that can benefit from network-wide energy optimization measures.

In still more embodiments, the storage 618 can include energy efficiency rating data 632. The energy efficiency rating data 632 may evaluate the energy efficiency of each network device (e.g., on a scale from 1 to 5). The energy efficiency rating data 632 may allow organizations to identify devices with poor energy ratings and consider suitable replacements to improve overall network sustainability.

Finally, in many embodiments, data may be processed into a format usable by a machine-learning model 626 (e.g., feature vectors), and or other pre-processing techniques. The machine-learning ("ML") model 626 may be any type of ML model, such as supervised models, reinforcement models, and/or unsupervised models. The ML model 626 may include one or more of linear regression models, logistic regression models, decision trees, Naïve Bayes models, neural networks, k-means cluster models, random forest models, and/or other types of ML models 626. The ML model 626 can be integrated with the sustainability evaluation logic 624 to enhance the optimization process associated with the NSI. By analyzing historical power consumption data and network usage patterns, the machine learning model 626 can predict future energy consumption trends, proactively adjust parameters, and/or provide relevant recommendations, leading to more efficient and sustainable network performance.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
 a processor;
 at least one network interface controller configured to provide access to a network; and
 a memory communicatively coupled to the processor, wherein the memory comprises a sustainability evaluation logic that is configured to:
  identify a plurality of network devices of the network;
  collect network device data from each of the plurality of network devices;
  calculate a network sustainability index of the network based on the network device data; and
  generate an indication associated with the network based on the calculated network sustainability index.

2. The device of claim 1, wherein the network device data for a network device of the plurality of network devices comprises one or more of:
 a reporting parameter associated with the network device,
 an optimization parameter associated with the network device, or
 an energy efficiency rating associated with the network device.

3. The device of claim 2, wherein the reporting parameter associated with the network device corresponds to at least one of:
 a first configuration associated with power consumption reporting,
 a second configuration associated with power consumption reporting at a component level granularity,
 a third configuration associated with power consumption reporting at a trunk port level granularity, or
 a fourth configuration associated with a power consumption reporting frequency.

4. The device of claim 2, wherein the optimization parameter associated with the network device corresponds to a configuration associated with participating in network energy optimization.

5. The device of claim 2, wherein each of the reporting parameter associated with the network device, the optimization parameter associated with the network device, or the energy efficiency rating associated with the network device is associated with a respective weight, and the network sustainability index is calculated based further on a set of weights.

6. The device of claim 2, wherein the generated indication is indicative of a satisfactory level of network energy optimization in response to the network sustainability index being greater than a predetermined threshold.

7. The device of claim 2, wherein the generated indication is indicative of at least one network device with suboptimal energy optimization in the plurality of network devices in response to the network sustainability index being less than a predetermined threshold.

8. The device of claim 2, wherein the generated indication is indicative of at least one recommended action in response to the network sustainability index being less than a predetermined threshold.

9. The device of claim 8, wherein the at least one recommended action comprises at least one of a recommended network device reconfiguration associated with a first network device or a recommended network device replacement associated with a second network device.

10. The device of claim 9, wherein the at least one recommended action comprises the recommended network device replacement associated with the second network device when the second network device is associated with a first energy efficiency rating that is less than an energy efficiency rating threshold, and the sustainability evaluation logic is further configured to:
 create a configuration file for a replacement network device based on one or more configurations of the second network device.

11. A device, comprising:
 a processor;
 at least one network interface controller configured to provide access to a network;
 a display;
 a memory communicatively coupled to the processor, wherein the memory comprises a sustainability evaluation logic that is configured to:
  identify a plurality of network devices of the network;
  collect network device data from each of the plurality of network devices;
  calculate a network sustainability index of the network based on the network device data;
  generate an indication associated with the network based on the calculated network sustainability index;
  configure the indication for display on the display; and
  display the configured indication on the display.

12. The device of claim 11, wherein the network device data for a network device of the plurality of network devices comprises one or more of:
 a reporting parameter associated with the network device,
 an optimization parameter associated with the network device, or
 an energy efficiency rating associated with the network device.

13. The device of claim 11, wherein the displayed indication indicates a satisfactory level of network energy optimization to a user.

14. The device of claim 11, wherein the displayed indication indicates at least one network device with suboptimal energy optimization in the plurality of network devices to a user.

15. The device of claim 11, wherein the displayed indication indicates at least one recommended action to a user.

16. A method for network sustainability management, comprising:
 identifying a plurality of network devices of a network;
 collecting network device data from each of the plurality of network devices;
 calculating a network sustainability index of the network based on the network device data; and
 generating an indication associated with the network based on the calculated network sustainability index.

17. The method of claim 16, wherein the network device data for a network device of the plurality of network devices comprises one or more of:
 a reporting parameter associated with the network device,
 an optimization parameter associated with the network device, or
 an energy efficiency rating associated with the network device.

18. The method of claim 17, wherein the reporting parameter associated with the network device corresponds to at least one of:
 a first configuration associated with power consumption reporting,
 a second configuration associated with power consumption reporting at a component level granularity,
 a third configuration associated with power consumption reporting at a trunk port level granularity, or a fourth configuration associated with a power consumption reporting frequency.

19. The method of claim 17, wherein the optimization parameter associated with the network device corresponds to a configuration associated with participating in network energy optimization.

20. The method of claim 17, wherein each of the reporting parameter associated with the network device, the optimization parameter associated with the network device, or the energy efficiency rating associated with the network device is associated with a respective weight, and the network sustainability index is calculated based further on a set of weights.

* * * * *